US007734726B2

(12) United States Patent
Dantzig et al.

(10) Patent No.: US 7,734,726 B2
(45) Date of Patent: Jun. 8, 2010

(54) SYSTEM AND METHOD FOR DYNAMICALLY ALLOCATING PROCESSING ON A NETWORK AMONGST MULTIPLE NETWORK SERVERS

(75) Inventors: Paul Michael Dantzig, Scarsdale, NY (US); Daniel Manuel Dias, Mohegan Lake, NY (US); Richard Pervin King, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 09/995,087

(22) Filed: Nov. 27, 2001

(65) Prior Publication Data
US 2003/0101265 A1 May 29, 2003

(51) Int. Cl.
G06F 15/16 (2006.01)
G06F 15/173 (2006.01)
G06F 9/46 (2006.01)

(52) U.S. Cl. .................. 709/219; 709/201; 709/203; 709/241; 718/105

(58) Field of Classification Search ......... 709/200–207, 709/217–229, 238–244; 370/395.4, 395, 370/4; 455/445; 718/104–105
See application file for complete search history.

(56) References Cited

U.S. PATENT DOCUMENTS

| 5,796,934 | A  | * | 8/1998  | Bhanot et al. .............. 714/4 |
| 6,112,225 | A  |   | 8/2000  | Kraft et al. ................ 709/202 |
| 6,195,680 | B1 | * | 2/2001  | Goldszmidt et al. ........ 709/203 |
| 6,223,206 | B1 | * | 4/2001  | Dan et al. .................. 718/105 |
| 6,240,454 | B1 | * | 5/2001  | Nepustil .................... 709/229 |
| 6,304,967 | B1 | * | 10/2001 | Braddy ...................... 713/150 |
| 6,374,305 | B1 | * | 4/2002  | Gupta et al. ................ 709/246 |
| 6,438,652 | B1 | * | 8/2002  | Jordan et al. ................ 711/120 |
| 6,442,165 | B1 | * | 8/2002  | Sitaraman et al. ......... 370/395.4 |
| 6,694,358 | B1 | * | 2/2004  | Swildens et al. ............ 709/218 |
| 6,728,748 | B1 | * | 4/2004  | Mangipudi et al. .......... 718/105 |
| 6,778,991 | B2 | * | 8/2004  | Tenorio ....................... 707/10 |
| 6,788,648 | B1 | * | 9/2004  | Peterson .................... 370/252 |
| 6,832,255 | B1 | * | 12/2004 | Rumsewicz et al. ......... 709/227 |
| 7,386,611 | B2 | * | 6/2008  | Dias et al. .................. 709/224 |
| 2001/0027479 | A1 | * | 10/2001 | Delaney et al. ............. 709/216 |
| 2002/0046232 | A1 | * | 4/2002  | Adams et al. ............... 709/200 |
| 2003/0149735 | A1 | * | 8/2003  | Stark et al. ................. 709/208 |
| 2005/0243862 | A1 | * | 11/2005 | Krishnan .................... 370/468 |

* cited by examiner

Primary Examiner—Asad M Nawaz

(57) ABSTRACT

The present invention provides a method, apparatus, and computer implemented instructions for processing Web and other Internet or Intranet based services. The system for processing Web requests includes a Web server with a connection to the Internet or Intranet with a predefined network bandwidth, a set of primary Web and application server cluster nodes to process the requests, and a dispatcher to allocate requests to nodes; in addition, one or more offload server nodes are connected to the network. Client Web requests arrive at the dispatcher of the Web server, which determines whether the incoming request can be handled at the primary Web server cluster, whether all or part of the user Web request should be offloaded to one of the offload server nodes, or whether the request should be throttled. If the dispatcher determines that the request should be handled by the primary Web server cluster, it is appropriately routed to one of the nodes in the primary Web server cluster; else if the dispatcher determines that the request should be offloaded, one of the offload server nodes or service providers is selected, and the request is either routed to a primary server node with the appropriate indication to offload all or part of the request, or the request is routed to the selected offload service provider; otherwise, the request is throttled by either routing it to a node which returns information that the service is overloaded, or if the Web servers are too busy to provide even an overload indication, then the request is dropped.

16 Claims, 3 Drawing Sheets

US 7,734,726 B2

SYSTEM AND METHOD FOR DYNAMICALLY ALLOCATING PROCESSING ON A NETWORK AMONGST MULTIPLE NETWORK SERVERS

FIELD OF THE INVENTION

The present invention relates generally to processing network data and more particularly to methods and systems for dynamically allocating network data processing amongst multiple network servers.

BACKGROUND OF THE INVENTION

The Internet is the world's largest electronic data network and continues to grow in geographical distribution and data capacity on a daily basis. Access to the Internet has become an essential part of the business process in organizations such as government, academia and commercial enterprises. The traffic directed to many popular Internet servers on the World Wide Web (Web) is growing rapidly. As a consequence, many techniques have been developed for scaling Web servers, for example by clustering computing nodes. Another technique for supporting a high traffic rate to popular sites is to cache data at caching servers external to the sites. More generally, offload servers are provided for processing some of the traffic targeted to the primary Web server.

One technique for offloading data from primary servers to offload servers, used by cache service providers such as Akamai Technologies (see www.akamai.com), is to alter the primary Web pages at the primary Web server, such that requests for embedded images in the Web pages go instead to the external servers of the cache service provider. In a typical Web page, the images are specified by Uniform Resource Locators (URLs), which typically identify the server from which the image is obtained and inserted onto the downloaded page. In the offloading technique used by cache service providers, the URL of the embedded images is modified to point to the cache service provider server(s). Using this technique, the Web browser first fetches the primary page from the home Web server. The client Web browser then determines that the URL for the embedded images is from the cache service provider. The client Web browser obtains the embedded image from the cache service provider rather than the home Web site. This technique results in significant static offloading, especially of network bandwidth, from the home Web server to the cache service provider.

Web requests from clients can be statically offloaded to offload servers using several different methods, one of which has been outlined above. In another method, all Web server requests to the primary server go first to one of the offload servers. If the offload service provider has the data to serve that request, it serves it directly to the requesting client. Otherwise, it routes the request to the primary Web Server, which returns the data to the offload server, which then returns it to the client.

One problem with the described cache offload approach is that all objects with modified URLs, such as the images mentioned above, get redirected to the cache service provider, regardless of whether the home Web server has the resources available to service the request. In fact, as shown and described in further detail below, the load on typical primary Web servers varies tremendously by day, time of day and day of year. To handle the peak load for the objects that cannot be redirected to the cache service provider, the primary Web server needs to have a significant network bandwidth, which is then sufficient to handle all of the offered load for a large fraction of the time. In fact, a primary Web server configured to handle peak expected requirements of non-offloadable objects can handle the entire offered load for most of the time. Only at the peak loads is it desirable, from the primary Web server loading standpoint, to offload some of the work to cache service providers.

U.S. Pat. No. 6,112,225 to Kraft et al. shows a task distribution processing system and methods whereby subscribing computers are used to perform computing tasks, typically a subtask of a large, aggregate task, during what would otherwise be idle time. The patent generally does not address the real-time, dynamic distribution of network processing requests as described herein.

The present inventors have determined that it would be desirable to be able to dynamically offload processing requirements from primary Web servers only when it is necessary to do so, for example because of limited Web server network bandwidth or limited Web server CPU capacity.

SUMMARY OF THE INVENTION

It is one object of the present invention to provide systems and methods for dynamically offloading all or part of a Web server processing request to an external server, caching service, or other service, depending on the current offered load and the resources currently available at the server.

It is a another object of the invention to provide systems and methods for dynamically selecting an external server or service provider depending on selected characteristics of a processing request.

The present invention provides a method, apparatus, and computer implemented instructions for processing Web and other Internet or Intranet based services. The system for processing Web requests includes a Web server with a connection to the Internet or Intranet with a pre-defined network bandwidth, and a set of primary Web and application servers clustered in a node to process the requests. A load controller allocates processing requests amongst the primary servers and one or more offload servers connected to the network.

Client Web requests arrive at the load controller of the primary Web server, which determines whether the incoming request can be handled at the primary Web server cluster, whether all or part of the user Web request should be offloaded to one of the offload servers, or whether the request should be throttled. If the dispatcher determines that the request should be handled by a primary server in the primary Web server cluster, it is appropriately routed to one of the nodes in the primary Web server cluster; otherwise if the dispatcher determines that the request should be offloaded, one of the offload server nodes or service providers is selected, and the request is either routed to a primary server node with the appropriate indication to offload all or part of the request, or the request is routed to the selected offload service provider. Otherwise, the request may be throttled by either routing it to a node which returns information that the service is overloaded, or if the Web servers are too busy to provide even an overload indication, then the request is dropped.

Further objects, features and advantages of the present invention will become apparent to the ones skilled in the art upon examination of the following drawing Figures and detailed description.

DETAILED DESCRIPTION OF THE INVENTION

The following common acronyms are used throughout this description in their conventional sense, described below:

| | |
|---|---|
| IP or TCP/IP | The Internet suite of protocols that must be adhered to in order to run an IP network. TCP and IP are the two most fundamental protocols of the IP suite of protocols. |
| TCP | The Transmission Control Protocol of the IP suite of protocols. |
| FTP | The standard TCP/IP File Transfer Protocol that allows a user to send or retrieve files from a remote computer. |
| HTTP | The Hypertext Transport Protocol is a TCP/IP protocol used by World Wide Web servers and Web browsers to transfer hypermedia documents across the Internet. |
| HTTPS | Same as above however the transactions are secured i.e. encrypted. |
| DNS | Domain Name System is a TCP/IP standard protocol that provides mapping between IP addresses and symbolic names. |
| URL (PORT) | HTTP Uniform Resource Locator allows to locate network resources via HTTP protocol. It indicates the location and name of the source on the server in the form http//host:port. Port is optional. |

While the invention is described below with respect to "the Internet," or "World Wide Web," it will be understood by those skilled in the art that the invention is equally applicable to other public and private networks or parts thereof, in any combination, that use the Internet suite of protocols (IP). Such networks are typically referred to as intranets and extranets to describe such combinations in the abundant literature on networks in general and IP networks in particular.

Figure 1:
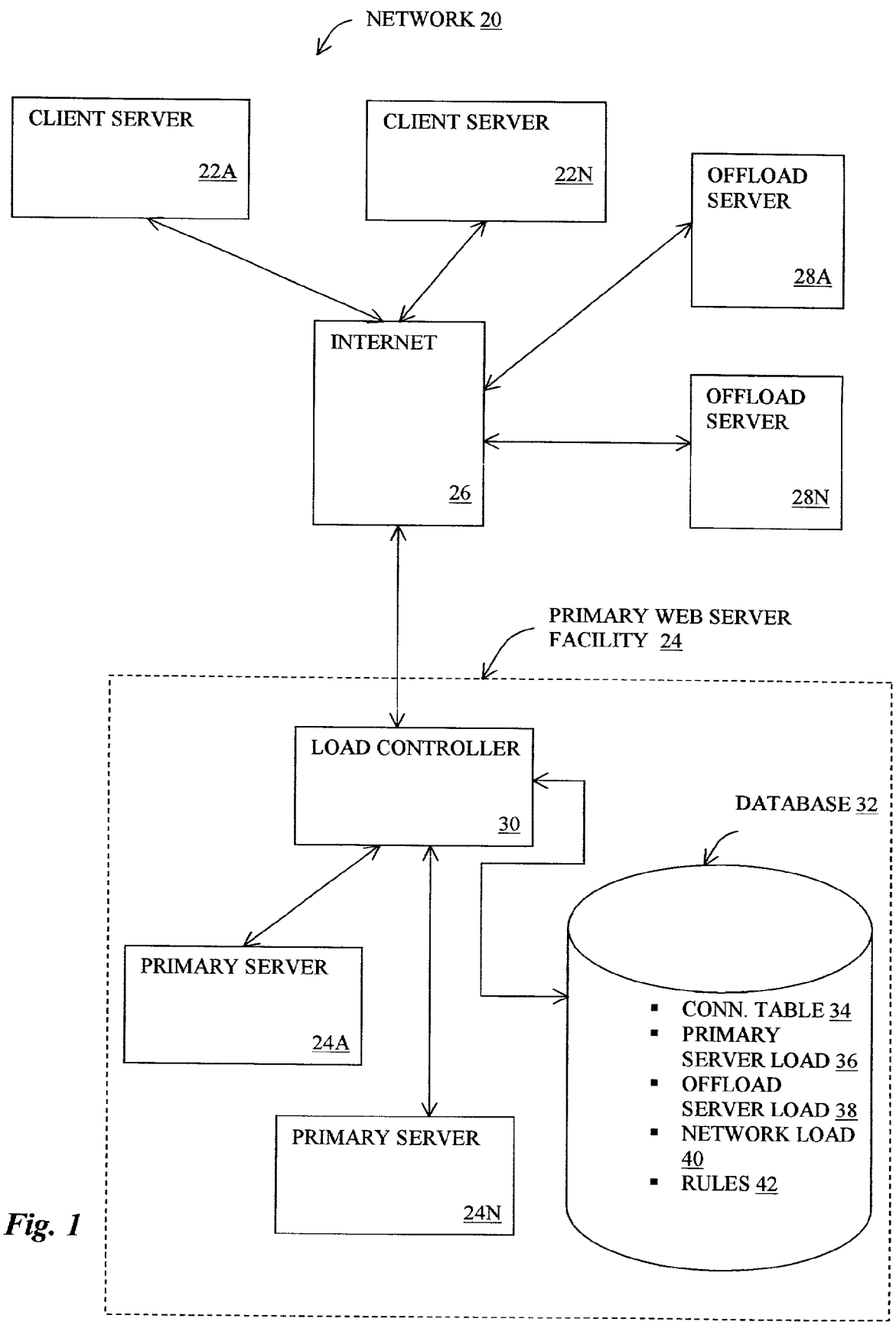
FIG. 1 is a diagrammatic view of a network including a controller for dynamically distributing server processing demand in accordance with the present invention.

With reference now to FIG. 1, there is shown a diagrammatic view of a network 20 including client servers 22A-22N accessing a primary web server facility 24, through the Internet 26. The primary web server operator has contracts with, or owns, a set of offload servers 28A-28N. In the context of this invention, offload servers 28A-28N may be provided by one or more offload service providers.

For purposes of illustration and without limitation, client servers 22A-N may comprise, for example, personal computers such as IBM™-compatible computers running a Windows™ operating system. Alternatively, client servers 22A-N, primary servers 24A-N and offload servers 28A-N may comprise workstations such as Sun workstations running a Solaris™ operating system, or a mainframe computer, many types of which are known in the art.

In accordance with the present invention, a load controller 30 in primary web server facility 24 dynamically manages the incoming client load between primary servers 24A-24N and offload servers 28A-28N in accordance with data, rules and control instructions stored in a database 32. More specifically, database 32 maintains a TCP/IP connection table 34, a table 40 relating to the primary server network loads, a table 36 relating to the primary server CPU loads, and optionally information relating to the offload server load 38. Database 32 in primary web server facility 24 further stores a control software and rule set 42 based on load conditions and other factors for determining how an incoming Web request is to be handled. Tables 40 and 36 include one or more threshold load designations which, if exceeded, result in processing requirements being shifted to offload servers 28A-N and/or other actions taken in accordance with the rules in rule set 42. It will be understood that many different load parameters can be measured, monitored and used to determine when incoming requests should be offloaded, including but not limited to: network load (discussed below with respect to Table 1), CPU utilization (discussed below with respect to Table 2), connections per second, various bandwidth loads, various memory loads, etc.

Load controller 30 may comprise a personal computer, workstation or mainframe computer as described above. Database 32 comprises a conventional storage device including an appropriate combination of semiconductor, magnetic and optical memory.

Table 1 below illustrates an exemplary set of threshold values for network load table 40. Network Load Thresholds are typically expressed in megabits per second.

TABLE 1

| Network Load | Network Load Threshold 1 | Network Load Threshold 2 | Network Load Threshold 3 |
|---|---|---|---|

For purposes of illustration, in one embodiment of the invention, network load thresholds 1, 2 and 3 are selected to be 35, 40 and 44 megabits per second, respectively.

Table 2 below illustrates an exemplary set of threshold values for primary server load table 36. Primary Server Load Thresholds are typically expressed in percent CPU utilization.

TABLE 2

| Primary Server CPU Load | Primary Server CPU Threshold 1 | Primary Server CPU Threshold 2 | Primary Server CPU Threshold 3 |
|---|---|---|---|

For purposes of illustration, in one embodiment of the invention primary server CPU thresholds 1, 2 and 3 are selected to be 90, 95 and 99 percent CPU utilization, respectively. Table 3 below illustrates an exemplary set of rules as may be stored in rule set 42.

TABLE 3

| | | | |
|---|---|---|---|
| Condition | Network Load and/or Primary Server CPUThreshold 1 Exceeded | Network Load and/or Primary Server CPUThreshold 2 Exceeded | Network Load and/or Primary Server CPU Threshold 3 Exceeded |
| Action | Offload Data Processing to Offload Server 28A-N | Return a "Server Overloaded/Busy" Message to User | Discard User Request with No Response |

In the described embodiment, the rules in rule set 42 indicate that when the load on the primary Web servers 24A-N, either in terms of the network load or the CPU bandwidth, exceed a first threshold stored in table 40 or 36, load controller 30 enables offloading of the client request. Methods for offloading data are described below.

When the load exceeds a second threshold stored in table 40 or 36, load controller 30 enables a "server overloaded/busy" message to be returned to the user.

When the load exceeds a third threshold stored in table 40 or 36, load controller 30 discards the client request.

Thus, load controller 30 may throttle requests by returning a page to a user indicating that the primary server is overloaded if the primary server load exceeds the second threshold, and dropping one or more processing requests if the primary server load exceeds the third threshold.

In addition to these basic rules based on primary server load, the load controller may optionally have rules based on offload server load, such as offload server network bandwidth usage or concurrent client TCP/IP connections, such that if a predetermined threshold for an offload server 28A-N is reached, then the offload server is deemed to be overloaded. In the event of an overload of offload servers 28A-N, offloading to that offload server is stopped until that load condition falls below the predetermined threshold. If all offload servers reach this overloaded condition, then all offloading is stopped until the load at one or more of the offload servers falls below the threshold.

Figure 2:
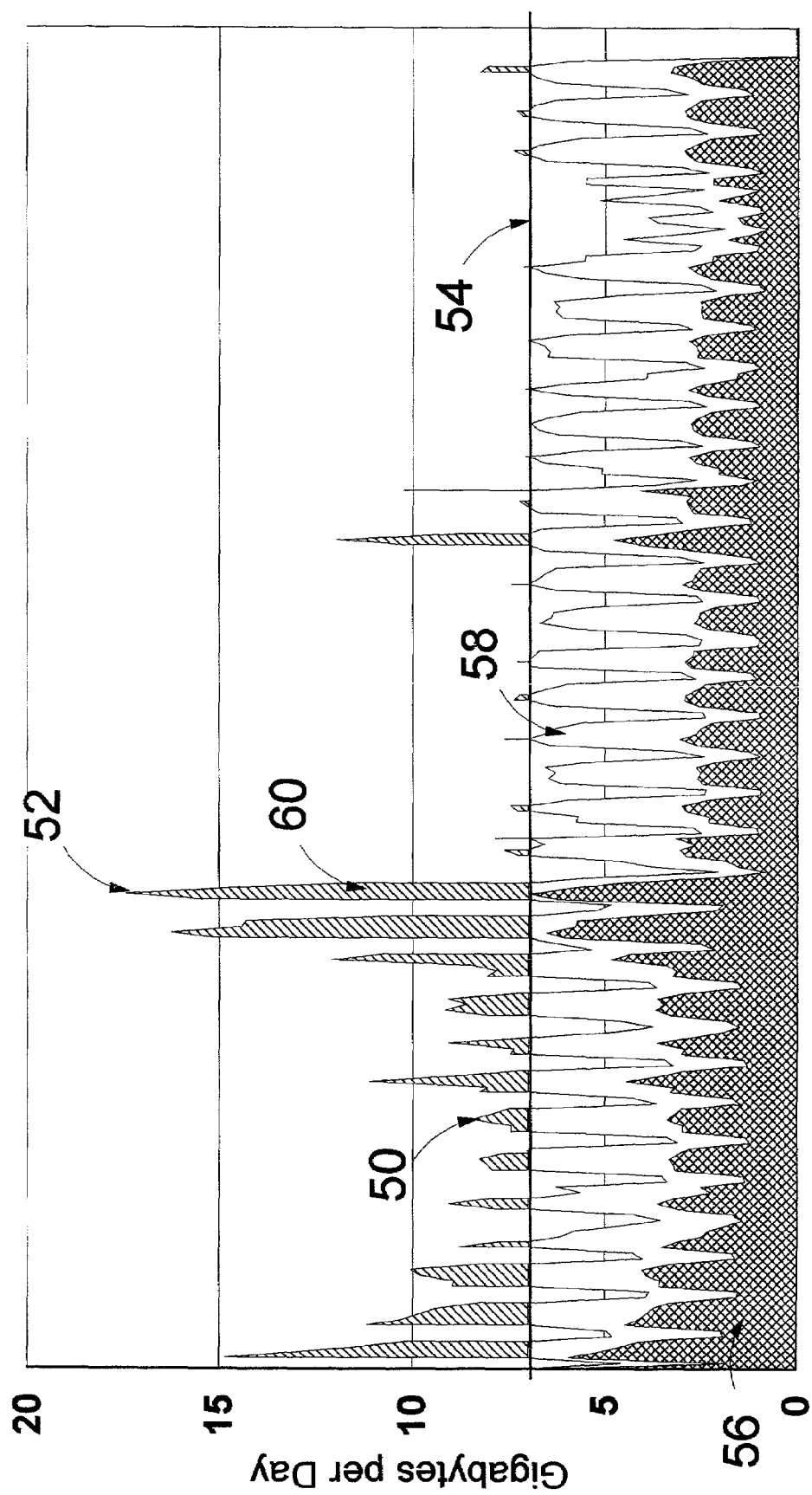
FIG. 2 is a graph showing one typical distribution of server processing demand against time.

With reference now to FIG. 2 there is shown a graph of the workload observed at a typical, exemplary commercial web site over the course of a year. The top curve 50 indicates the total demands of bandwidth made by the users of the site on each day of that year. If no offloading service were available, the web site would have to be capable of delivering data at the peak rate observed during the year 52, which is about 17,500 Gigabytes per day. When offloading is available, it is possible to configure the site such that it only need support the portion of the work that cannot be offloaded. If, for example, 60% of the work can be offloaded, the capacity of the web site can be reduced to the level of the indicated line 54 at 7,000 Gigabytes per day. The static assignment of all offloadable work to an offloading service would lead to the web site always only doing 40% of the work being demanded by its users, indicated by the crosshatched area 56. This leaves substantial unused capacity most of the time, indicated by the empty area 58 between the crosshatched area 56 and the system capacity line 54.

By making the offloading decision dynamically in accordance with the present invention, the web site can make use of its excess capacity, with the offloading service only being used to handle that part of the demand which exceeds the web site's capacity. This excess demand, indicated by the diagonally striped area 60 above the capacity line 54, would then be the only work handled by the offloading server or service. For this particular web site, this would reduce the amount of offloaded work from 60% of the work demanded by the users to less than 1% of it, over the course of the year. This, of course, would result in substantially reduced cost for the services of offload servers 28A-N.

There is now described one method for dynamic offloading in further detail for the case where the resource bottleneck is the network bandwidth at the primary Web server. Those skilled in the art will readily appreciate that other methods for dynamic offloading can be used, and other cases of resource bottleneck can also be handled with simple variations of the method described below. In the described method, two versions of each page are maintained at the server: one version where the imbedded material such as images uses links to the primary Web server, and another where the imbedded material uses links to the offload service.

Figure 3:
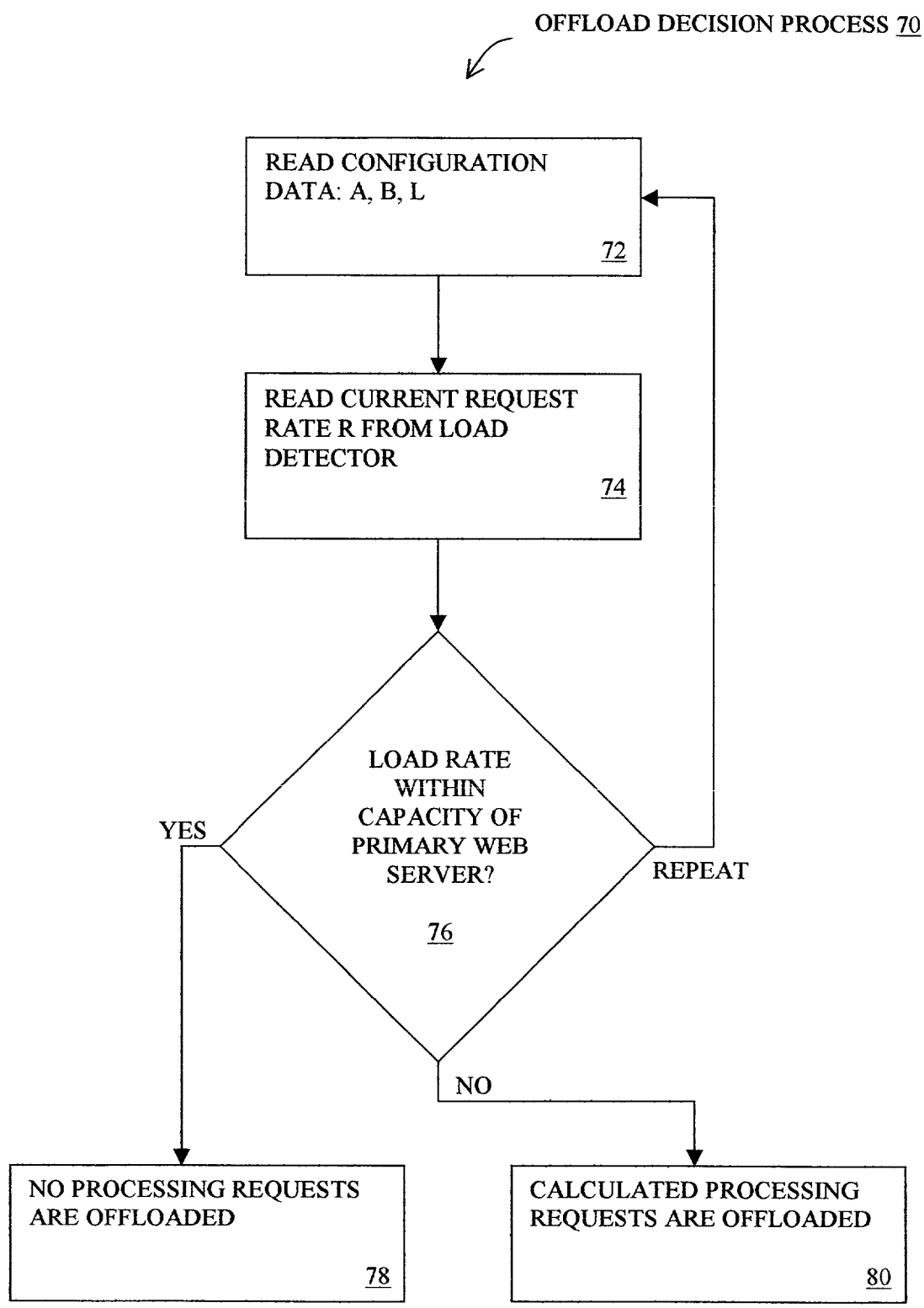
FIG. 3 is a flow chart illustrating one method of dynamically distributing processing demand in accordance with the present invention.

With reference now to FIG. 3, a process 70 is shown for deciding when to offload processing requirements from primary servers 24A-N to offload servers 28A-N, and what fraction of the incoming requests should be directed to the version of the requested web page that specifies the links to the offloaded, imbedded material. This decision-making process runs periodically, with load controller 30 operating in accordance with the results to control how the requests are handled.

Initially at step 72 configuration information is read, including: A, the number of bytes that must be served to satisfy a client request whose imbedded material is being offloaded; B, the number of bytes that must be served to satisfy a request when none of it is offloaded; and L, the bandwidth limit of the web site primary servers 24A-N, measured in bytes per second.

At the next step 74, the rate R at which user requests are arriving at the site, measured in requests per second, is determined by load controller 30. Then it is determined at step 76 by comparison of the measured load to the threshold loads in table 2 if the load represented by that request rate R is within the limits of the web site. If the load R is within the capacity of primary servers 24A-N, no processing requests are offloaded, that is the fraction of the requests to be offloaded X is set to 0 (step 78).

It is also possible that at request rate R, the load on the web site will exceed its capacity even if all of the requests are offloaded, in which case all of the processing requests are offloaded, that is X is set to 1, to keep the load on primary servers 24A-N as small as possible. If the determination falls between these extremes, the load is supportable, but only if some fraction of the work is offloaded. In this instance, the fraction X of offloaded processing requests is set such that the total load on the web site, $R(XA+(1-X)B)$, is equal to the limit L that the web site can handle. (Step 80).

Having determined the new value for the fraction X of processing requests to be offloaded, the decision making process is suspended for some period of time. After that time has elapsed, processing continues. Decision-making process 70 is repeated to again calculate the percentage X of processing requests that are to be offloaded from primary servers 24A-N to offload servers 28A-N. The length of time to suspend processing can range anywhere from less than a second to several hours, or even more. Repeating the processing more frequently improves the responsiveness of the system, but also increases the cost of doing the processing. For a web site, a suspend time between one minute and one hour is generally appropriate.

There have thus been described systems and methods for determining when to handle incoming Web requests entirely in the primary Web server, and when to offload part of the request to an offload service. Those skilled in the art will readily appreciate that other methods can be used. For example, the maximum number of concurrent TCP/IP requests to the primary Web server can be used as the metric of load. If the number of concurrent TCP/IP requests to the primary Web server exceeds a threshold, the request is offloaded, otherwise the request is handled entirely at the primary Web server. The threshold for the number of concurrent TCP/IP requests beyond which requests are offloaded can be adjusted dynamically, based on the estimated bandwidth per connection that is being used, as measured by the load controller.

In conjunction with the method described above for deciding when to offload a request, systems and methods have been described for effecting how the client Web requests are offloaded from a primary web server to offload servers. In one method, two versions of each page are maintained at the primary Web server: one version of the Web pages has the links for imbedded objects (for example images in the Web page) pointing to the primary Web server itself, and a second version has imbedded objects pointing to an offload service. The base URL of the Web site is set to point the default pages with imbedded objects with links to the primary Web site. If the request is to be offloaded, the URL of the incoming requests is changed by the load controller to a corresponding URL which represents the same page with imbedded objects with links to the offload service. The URL of the links can be changed dynamically by the load controller to determine which offload service provider is selected to handle the imbedded objects.

In another embodiment of the invention, the IP port of the request is used to indicate which version of the page is to be served by the Web server node. If the request does not need to be offloaded, a default port (typically port 80) is used; if the request is to be offloaded, the request is changed to another specific port by load controller 30. The primary Web server maps this other port to the version of pages to be offloaded, and returns this page to the requesting client, and changes the port number back to the port number of the original request (typically port 80) in the response.

In yet another embodiment of the invention, different IP addresses are used to identify a request to be served by the primary Web server versus those requests to be offloaded. The incoming request uses the default IP address used for the case of no-offloading, and load controller 30 changes the IP address of the request when it determines that the request is to be offloaded and forwards the request to a selected primary Web server node. The primary Web server node returns the correct base Web page, depending on target IP address used by the request, and changes back the IP address to that of the original request in the returned data to the client.

There have been described methods and systems for determining how incoming requests are either handled principally at the primary server or at the offload server or service, by essentially using two versions of Web pages. Those skilled in the art will readily appreciate that other methods for offloading can be used. For example, instead of two versions of pages representing whether to offload or not, the load controller can directly route an incoming request to a selected offload service when the load threshold at the primary Web server is exceeded. This is accomplished by changing the target IP address of the request to that of the offload server. With this scheme, the offload server can serve the requested Web page if it is cached at the offload server; if the offload server does not have the cached page, then the offload server obtains the page from the primary Web server and returns it to the client. The primary Web server can push data, such as shopping catalog pages or other Web data, to offload servers, in order to increase the probability that the offload server can handle all or part of the offloaded Web request. By making the decision for offloading at the load controller located at the primary Web site, the service can be optimized from the point of view of the primary Web server operator.

In conjunction with the above described systems and methods for selecting when to offload client Web requests from the primary Web server to offload servers, and the above systems and methods for how to offload the client requests to an offload server, there are now provided systems and methods for determining which offload server or offload service provider to shift processing requests to. The choice of selecting an offload service provider to which embedded objects are offloaded is based on several factors. One factor is the client identity. This could be in terms of the client IP address, gateway address on the request, or on the client identity determined by a cookie or other means. The main selection in this case is based, for example, on affinity or proximity of the client to one of the offload servers or services. This will be based on tables maintained at the server site that indicate affinity of certain IP addresses to certain offload sites. This table could be built either statically or dynamically. For instance, it may be known a priori, that certain offload services are collocated with certain dominant Internet Service Providers (ISPs), which in turn have specific gateway IP addresses. For instance, an Akamai service may be collocated with AOL™, and the server-side table would indicate this affinity. Similarly, AT&T offload servers could have affinity for clients identified as arriving through Worldnet™ gateways.

Another method of determining affinity is by creating probe stations from different ISPs or global locations. Response time from these probe stations is used to create a dynamic affinity metric between certain gateway addresses and offload service providers.

The price structure for offload services can be another factor in selecting an offload service provider. The prices of certain offload services are based on the amount of traffic they handle for a given Web server. The granularity of their usage measurement, however, is very low. There is a fee for the first, large quantum of data transmission, with substantial increments in cost for each succeeding quantum. Rather than pay for another quantum of service from the offload service provider, there will, on occasion, be times when it would be preferable to consume more of an already purchased quantum of service from some other provider of offloading service. This decision can be based on measurements of bandwidth that have already been offloaded to each offloading service provider and on knowledge of the pricing structures of the respective providers.

Another factor for selecting an offload service provider is the load on (or availability of) the offloading services: the performance (or availability) of the different offloading services can be probed, with the results determining the choice of offloading service. Those skilled in the art will readily appreciate that other methods of choosing the offloading server or service are possible.

There have thus been provided methods and systems for real-time, dynamic allocation of processing requests between primary and offload servers in an IP-based network. The invention has application in Internet and other network environments where data is provided, responsive to client requests, from network servers.

The description of the present invention has been presented for purposes of illustration and description, and is not intended to be exhaustive or limited to the invention in the form disclosed. Many modifications, changes, improvements and variations will be apparent to those of ordinary skill in the art. The described embodiments were chosen and described in order to best explain the principles of the invention, the practical application, and to enable others of ordinary skill in the art to understand the invention for various embodiments with various modifications as are suited to the particular use contemplated.

What is claimed is:

1. A method, in a network comprising a primary server and a plurality of offload servers, for dynamic offloading of processing requests from said primary server to any one of said plurality of offload servers, the method comprising steps of:
   determining a load on said primary server;
   if the load on said primary server is less than a first threshold, serving processing requests at said primary server;

only if the load on said primary server exceeds said first threshold, then offloading at least a portion of said processing requests to any one of said plurality of offload servers while said primary server continues to serve a remainder of said processing requests, wherein said any one of said plurality of offload servers processes said at least a portion of said processing requests and is associated with an offload threshold and the at least a portion of said processing requests is the only work handled by said any one of said plurality of offload servers, wherein the offloading is performed in accordance with a respective offload threshold for each of the plurality of offload servers, such that if said respective offload threshold is exceeded for every one of the plurality of offload servers, said offloading is stopped until a load on one of said plurality of offload servers falls below said respective offload threshold; and if the load on said primary server exceeds a second threshold, throttling at least one of said processing requests, wherein serving the processing requests at said primary server includes returning a page to a user wherein all embedded objects in the page have links to said primary server; and wherein offloading at least a portion of the processing requests to any one of said plurality of offload servers includes serving a base page at said primary server in which links for embedded objects point to any one of said plurality of offload servers.

2. The method of claim 1 wherein said load comprises bandwidth utilization and said first threshold is a network bandwidth utilization of said primary server.

3. The method of claim 1 wherein said load comprises CPU utilization and said first threshold is a central processing unit (CPU) utilization of said primary server.

4. The method of claim 1 wherein offloading at least a portion of the processing requests to any one of said plurality of offload servers includes routing an incoming Web request to a selected offload server.

5. The method of claim 1 wherein throttling at least one of said processing requests includes returning a page to a user indicating that a server is overloaded.

6. The method of claim 1 wherein throttling at least one of said processing requests includes dropping the at least one of said processing requests without returning any information to a user.

7. The method of claim 1 wherein throttling at least one of said processing requests includes returning a page to a user indicating that a server is overloaded if said load exceeds said second threshold, and dropping said at least one of said processing requests if said load exceeds a third threshold.

8. The method of claim 1 wherein a determination of which of said plurality of offload servers that at least a portion of said processing requests is to be offloaded to is based on one or more of a group including; a client identity, a client gateway (Internet Protocol) address, a price of offload service, or a current or previous load on the any one of said plurality of offload servers.

9. A method for allocating processing requirements on an Internet Protocol network between a primary server and a plurality of offload servers, comprising:

periodically evaluating processing requests to determine a load on said primary server;

if said load exceeds a first threshold, for a predetermined period of time directing at least one of said processing requests to any one of said plurality of offload servers while said primary server continues to serve a remainder of said processing requests, wherein said any one of said plurality of offload servers processes said at least one of said processing requests and is associated with an offload threshold and said at least one of said processing requests is the only work handled by said any one of said plurality of offload servers, wherein the directing is performed in accordance with a respective offload threshold for each of the plurality of offload servers, such that if said respective offload threshold is exceeded for every one of the plurality of offload servers, said offloading is stopped until a load on one of said plurality of offload servers falls below said respective offload threshold;

only if said load does not exceed said first threshold, directing said processing requests to said primary server; and if the load on said primary server exceeds a second threshold, throttling at least one of said processing requests, wherein directing said processing requests to said primary server further includes returning a page to a user wherein all embedded objects in the page have links to said primary server; and directing at least one processing request to any one of said plurality of offload servers further includes serving a base page at said primary server in which links for embedded objects point to said any one of said plurality of offload servers.

10. The method of claim 9 wherein said load comprises network bandwidth and said first threshold is a measure of network bandwidth utilization of said primary server.

11. The method of claim 9 wherein said load comprises central processing unit (CPU) utilization and said first threshold is a measure of CPU utilization of said primary server.

12. The method of claim 9 wherein directing at least one processing request to any one of said plurality of offload servers further includes routing an incoming Web request to a selected offload server.

13. The method of claim 9 wherein said throttling at least one of said processing requests comprises returning a page to a user indicating that a server is overloaded.

14. The method of claim 9 wherein said throttling of at least one of said processing requests comprises dropping the at least one of said processing requests without returning any information to a user.

15. The method of claim 9 wherein the throttling of at least one of said processing requests comprises returning a page to a user indicating that the primary server is overloaded if the load exceeds the second threshold, and further comprising dropping the at least one of said processing requests if the load exceeds a third threshold.

16. The method of claim 9 further including determining which of said plurality of offload servers said at least one of said processing requests is to be offloaded to based on one or more of a group including: a client identity, a client gateway (Internet Protocol) address, a price of offload service, or a current or previous load on the any one of said plurality of offload servers.

* * * * *